April 2, 1963 A. G. MITCHELL ET AL 3,083,444

MANUFACTURE OF DELAY LINES

Filed Nov. 30, 1959

INVENTORS
Arthur George Mitchell
and
John Ralph Bagnall
BY Baldwin & Wight
ATTORNEYS

3,083,444
MANUFACTURE OF DELAY LINES

Arthur George Mitchell and John Ralph Bagnall, Chelmsford, England, assignors to English Electric Valve Company Limited, London, England, a company of Great Britain Filed Nov. 30, 1959, Ser. No. 856,155
Claims priority, application Great Britain Feb. 10, 1959
5 Claims. (Cl. 29—155.5)

This invention relates to the manufacture of delay lines and more specifically to the manufacture of so-called interdigital delay lines such as are employed in travelling wave tubes.

As is well known travelling wave tubes operate by virtue of interaction produced between an electron stream and a travelling wave in a delay line adjacent said stream. In some tubes the travelling wave travels in the same direction as the electrons of the stream, while in others, i.e. in the so-called backward wave travelling wave tubes, the interaction occurs between beam electrons travelling in one direction and a wave travelling along the delay line in the other opposite direction. A common form of delay line is the so-called interdigital form. In this form of delay line there are two comb-like members (i.e. members consisting of spaced fingers extending from a back-piece) so assembled that the fingers of one lie in the spaces between the fingers of the other.

Figure 1:
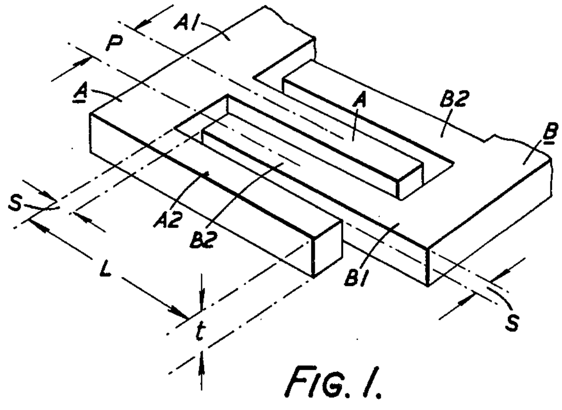
Figure 2:
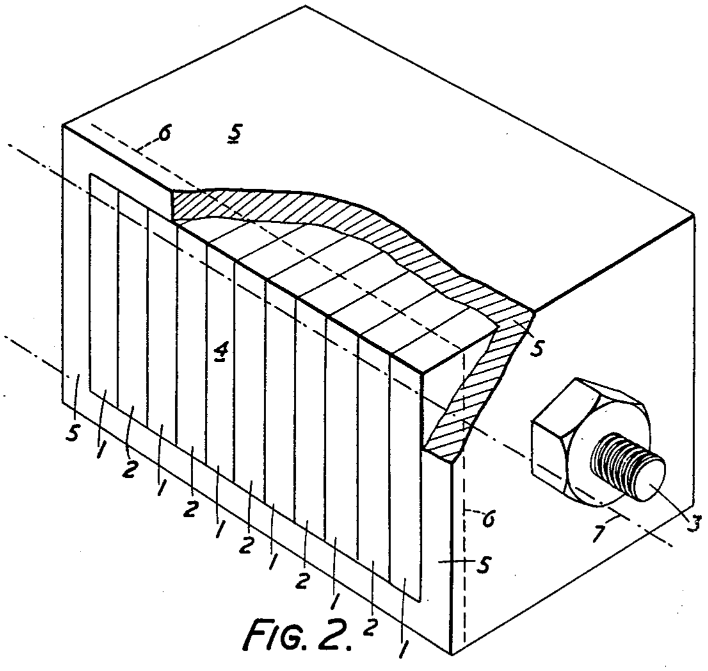

The invention is illustrated in and explained in connection with the accompanying drawings in which FIG. 1, which is provided for purposes of explanation shows part of a typical known interdigital delay line such as might be used in a backward wave travelling tube and FIG. 2 illustrates one way of carrying out the present invention.

Referring to FIG. 1 the delay line therein partly shown consists of two comb-like members A and B (shown broken away) each consisting of a back-piece A1 or B1 from which extend parallel rectangularly sectioned fingers A2 or B2. As will be seen the fingers B2 of comb B are interleaved between and spaced from the fingers A2 of comb A.

An interdigital delay line for use in a travelling wave tube has to be dimensioned with high precision in order that the tube is to have required characteristics and performance. This necessity for high precision leads to manufacturing difficulties and known methods of manufacturing interdigital delay lines are very expensive to practice with the high degree of precision often required. The most important dimensions are shown in FIGURE 1 and are (*a*) the finger length L, (*b*) the finger spacing S, (*c*) the pitch P, i.e. the distance between the centre line of one finger of one comb and the centre line of an adjacent finger on the other comb, and (*d*) the thickness *t*. In some tubes the pitch is constant, but in others, it changes along the length of the line. To manufacture an interdigital line such as that shown in FIGURE 1 by machining the combs from the solid is an expensive process and it is particularly difficult and expensive to make, by such machining, a series of interdigital lines all precisely of the same dimensions—as is required, of course, if a series of tubes of the same performance and characteristics is to be obtained. The present invention seeks to provide improved methods of manufacturing interdigital lines which will satisfy the onerous requirements as to precision and be at the same time relatively economical and easy to practice under factory conditions.

According to this invention a method of manufacturing a comb-like member for an interdigital delay line includes the steps of making a clamped stack of plates of predetermined thicknesses and of the same shape and face areas, said plates including plates of one metal and further plates of a different material with the further plates interspersed between the plates of said one metal; depositing metal to a required thickness on at least one longitudinal face of the stack, said metal being a material different from that used for said further plates; removing from said stack a sheet of predetermined thickness including portions of all the plates in the stack and deposited metal holding the same in their relative positions; and dissolving away the portions of the further plates included in said sheet.

According to a feature of this invention a method of manufacturing a comb-like member for an interdigital delay line includes the steps of making a plurality of plates of predetermined thicknesses of one metal; making a plurality of further similar plates of pre-determined thicknesses of a different metal; assembling the plates and further plates alternately and clamping them in a stack; machining the longitudinal faces of the stack to predetermined dimensions; depositing metal other than that of which the further plates are made on at least one longitudinal face of the stack; removing from the stack a sheet of desired thickness between planes which are parallel to a longitudinal stack face on which no metal has been deposited; and dissolving away the portions of the further plates in the removed sheet. Preferably the longitudinal faces of the stack are machined to be those of a right rectangular parallelepiped.

In practice, it is convenient, when depositing metal, to deposit it on all faces of the stack except one longitudinal face, and afterwards to cut off from the removed sheet metal not required in the finished comb.

The metal deposited is preferably deposited electrolytically and the dissolving of the further plate portions in the removed sheet is preferably effected by a solvent which will dissolve the material of the further plates but not the material of the first mentioned plates or the deposited metal. To quote preferred practice, the first mentioned plates and the deposited metal may be copper and the further plates may be steel, hydrochloric acid being a suitable solvent in this case.

If the comb member is required to have fingers all of the same width the first mentioned plates will be all of the same thickness and, similarly, if the fingers of each comb are to be separated by the same spacings the further plates will be all of the same thickness. However, it will be apparent that by suitably choosing the thicknesses of the plates assembled in the stack, combs with fingers of desired different widths and/or with desired different spacings may be made.

FIGURE 2 shows an intermediate stage in a preferred method of manufacturing a comb member for a line such as that shown in FIGURE 1.

Referring to FIGURE 2 two sets of plates 1 and 2 are made, the plates 1 being of copper and the plates 2 of some other material, for example, steel. These plates are all machined accurately to predetermined thicknesses. In the case of a comb having identical fingers throughout its length with identical spacings between them, the plates 1 are machined accurately to be of a thickness equal to the required finger width (the finger dimension at right angles to the dimensions L and *t* of FIGURE 1) and the plates 2 are accurately machined to a thickness equal to that required for the spacing between two adjacent fingers of the comb. The plates 1 and 2 are then assembled in a stack so that they alternate with each of the plates 2 between a pair of plates 1. The plates in the stack are clamped firmly together in any convenient way, for example, by one or more longitudinal studs passing therethrough and carrying clamp nuts on their ends, and the stack longitudinal faces are machined to form those of a right rectangular parallelepiped of desired dimensions. One clamp stud is represented at 3 in FIGURE 2, but obviously more than one could be provided and they may be placed in any convenient position through the stack. The required precise configuration of the stack is preferably obtained, as stated, by accurate machining of its four longitudinal faces after assembly, though it is possible (though not preferred) to machine the edges of the individual plates before assembly.

One longitudinal face, for example, the face 4 of the stack, is now masked in any convenient known manner so as to make it resistive to plating deposition and the stack with its masked face is immersed in a copper electroplating bath. Copper is then deposited to a required predetermined thickness (say one quarter of an inch) over the unmasked faces of the stack, that is on less than all of the longitudinal faces of the stack, so as to become mechanically and electrically bonded to the copper of which the plates 1 are formed. Such a predetermined thickness of the deposited metal is sufficient to hold together and unite the stack of plates. The deposited copper, shown broken away in one place in FIGURE 2, is represented in the said figure at 5.

The plated stack is now removed from the bath and cleaned and a "slice" or sheet is cut from the plated stack along a plane of cutting running parallel to the unplated face 4. This plane of cutting is represented by the broken line 6 in FIGURE 2 and is so chosen that the resultant sheet cut away has a thickness a little more than the required thickness *t* (FIGURE 1) of the finished comb. The sheet is then machined to the required thickness and it will be seen that it will consist of portions of the plates 1 and 2 side by side and held together and united by the deposited copper 5. The machined cut-away sheet is now immersed in a predetermined solvent in which the metal of the plates 1 is substantially insoluble and the material of the plates 2 is soluble. The solvent may be, for example, HCl, which dissolves the steel plates 2 but leaves the copper substantially unchanged. The result will leave the plates 1 spaced by spaces previously occupied by the steel plates 2 and it may then be cut off at one edge, for example as indicated by the chain line 7 in FIGURE 2 to give a comb with fingers of a required length L. The comb is then sintered and two such combs when fitted together, for example by bolting on to a base plate (not shown) will form an interdigital line like that of FIGURE 1. It will be seen that great accuracy at relatively small cost can be obtained with this method of manufacture. Furthermore, a considerable number of sheets can be cut from the same stack by cutting each time along a plane parallel to the unplated face 4, using that face as a datum for cutting (for the first cut) and subsequent parallel faces left by each cut as a datum for the next cut. All such sheets or slices will be to a high degree of accuracy alike after being machined for thickness, so that two combs made in this way from the same stack will interleave with great precision. In practice the plates of the stack may be made large enough to enable a considerable number of sheets, each of which will ultimately form a comb, to be cut therefrom. Furthermore, by suitably choosing the thickness of the individual plates in the stack the method of manufacture may be used for making combs of desired varying pitches.

Of course, the invention is not limited to the use of copper and steel, but these materials are quite convenient and practical.

We claim:

1. A method of manufacturing a comb-like member having a set of spaced fingers extending from a backplate for an interdigital delay line, said method including the steps of making a clamped stack of plates of predetermined thicknesses and of the same shape and face areas, said plates including plates of one metal substantially insoluble in a predetermined solvent and having thicknesses equal to the widths of said fingers and further plates of different material soluble in said predetermined solvent and having thicknesses equal to the spacing between said fingers with the further plates interspersed between the plates of said one metal; depositing metal to a predetermined thickness on all outer faces of the stack except on one longitudinal outer face of the stack, said predetermined thickness of the deposited metal being sufficient to cause said deposited metal mechanically and electrically to bond said deposited metal to the plates of said one metal and to hold together and unite said stack of plates, said deposited metal being a material different from that used for said further plates and being substantially insoluble in said predetermined solvent; removing from said stack, along a plane which is parallel to said one longitudinal outer face of said stack, a sheet of predetermined thickness including portions of all the plates in the stack and deposited metal holding the same in their relative positions; dissolving away the portions of the further plates in said sheet with the predetermined solvent and machining the undissolved remaining portion of said sheet to the required overall dimensions of the finished comb.

2. A method of manufacturing a comb-like member having a set of spaced fingers extending from a backplate for an interdigital delay line, said method including the steps of making a plurality of first plates of one metal substantially insoluble in a predetermined solvent and having thicknesses equal to the widths of said fingers; making a plurality of further similar plates of a different metal soluble in said predetermined solvent and having thicknesses equal to the spacing between said fingers; assembling the first plates and further plates alternately and clamping them in a stack; machining the longitudinal faces of the stack to predetermined dimensions; depositing metal other than that of which the further plates are made on at least one longitudinal face and less than all longitudinal faces of the outside of the stack, said deposited metal being substantially insoluble in said predetermined solvent, and mechanically and electrically bonding said deposited metal to said first plates, said deposited metal being deposited on said one longitudinal face in sufficient thickness to hold together and unite said stack of plates; removing from the stack a sheet which includes deposited metal which has been deposited on one of said longitudinal faces and which sheet is of desired thickness between planes which are parallel to a longitudinal stack face on which no metal has been deposited; dissolving away the portions of the further plates in the removed sheet with said predetermined solvent; and machining said sheet to the required overall dimensions of the finished comb.

3. A method as claimed in claim 1 wherein the longitudinal faces of the stack are machined to be those of a right rectangular parallelepiped.

4. A method as claimed in claim 1 wherein the deposited metal is deposited electrolytically.

5. A method as claimed in claim 1 wherein the first mentioned plates and the deposited metal are made of copper and the further plates are made of steel.

References Cited in the file of this patent

UNITED STATES PATENTS

| | | |
|---|---|---|
| 2,499,977 | Scott | Mar. 7, 1950 |
| 2,641,731 | Lines | June 9, 1953 |
| 2,834,915 | Dench | May 13, 1958 |
| 2,866,727 | Keegan | Dec. 30, 1958 |
| 2,882,587 | Unger et al. | Apr. 21, 1959 |